US010616471B2

(12) United States Patent
Molgaard et al.

(10) Patent No.: US 10,616,471 B2
(45) Date of Patent: Apr. 7, 2020

(54) IMAGE ADJUSTMENTS BASED ON DEPTH OF FIELD ESTIMATIONS

(71) Applicant: Apple Inc., Cupertino, CA (US)

(72) Inventors: Claus Molgaard, Los Gatos, CA (US); Paul M. Hubel, Mountain View, CA (US); Ziv Attar, Palo Alto, CA (US); Ilana Volfin, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/697,224

(22) Filed: Sep. 6, 2017

(65) Prior Publication Data

US 2018/0070007 A1 Mar. 8, 2018

Related U.S. Application Data

(60) Provisional application No. 62/384,029, filed on Sep. 6, 2016.

(51) Int. Cl.
*H04N 5/232* (2006.01)
*G06K 9/46* (2006.01)
(Continued)

(52) U.S. Cl.
CPC ..... *H04N 5/23216* (2013.01); *G06K 9/00248* (2013.01); *G06K 9/3233* (2013.01);
(Continued)

(58) Field of Classification Search
CPC .. H04N 5/23216; H04N 5/23219; G06K 9/46; G06K 9/00228; G06K 9/3233; G06K 9/00201; G06T 7/50; G06T 2207/10028
See application file for complete search history.

(56) References Cited

U.S. PATENT DOCUMENTS

2009/0262987 A1 10/2009 Ioffe et al.
2010/0021064 A1\* 1/2010 Lee .................... G06K 9/00234
382/190
(Continued)

FOREIGN PATENT DOCUMENTS

EP 2485495 A2 8/2012
WO WO 2015/183696 A1 12/2015

OTHER PUBLICATIONS

International Patent Application No. PCT/US2017/050269; Int'l Search Report and the Written Opinion; dated Nov. 22, 2017; 14 pages.
(Continued)

*Primary Examiner* — Shahbaz Nazrul
(74) *Attorney, Agent, or Firm* — BakerHostetler (57) ABSTRACT

Techniques are described for automated analysis and filtering of image data. Image data is analyzed to identify regions of interest (ROIs) within the image content. The image data also may have depth estimates applied to content therein. One or more of the ROIs may be designated to possess a base depth, representing a depth of image content against which depths of other content may be compared. Moreover, the depth of the image content within a spatial area of an ROI may be set to be a consistent value, regardless of depth estimates that may have been assigned from other sources. Thereafter, other elements of image content may be assigned content adjustment values in gradients based on their relative depth in image content as compared to the base depth and, optionally, based on their spatial distance from the designated ROI. Image content may be adjusted based on the content adjustment values.

38 Claims, 9 Drawing Sheets

(51) Int. Cl.
*G06K 9/38* (2006.01)
*G06K 9/00* (2006.01)
*G06T 7/50* (2017.01)
*G06K 9/32* (2006.01)

(52) U.S. Cl.
CPC ............... *G06K 9/38* (2013.01); *G06K 9/46* (2013.01); *G06T 7/50* (2017.01); *H04N 5/23219* (2013.01); *G06K 9/00201* (2013.01); *G06T 2207/10028* (2013.01)

(56) References Cited

U.S. PATENT DOCUMENTS

| | | | |
|---|---|---|---|
| 2012/0249836 A1 | 10/2012 | Ali et al. | |
| 2014/0176750 A1* | 6/2014 | Pajak | H04N 5/225 348/222.1 |
| 2014/0184758 A1* | 7/2014 | Lee | H01L 51/5281 348/51 |
| 2014/0211045 A1* | 7/2014 | Tanaka | H04N 5/2621 348/239 |
| 2014/0267243 A1 | 9/2014 | Venkataraman et al. | |
| 2015/0042760 A1 | 2/2015 | Chu | |
| 2016/0110623 A1* | 4/2016 | Kim | G06K 9/3233 382/103 |
| 2017/0127039 A1* | 5/2017 | Liu | H04N 5/23293 |
| 2017/0249742 A1* | 8/2017 | Kadri | G06T 5/002 |

OTHER PUBLICATIONS

International Patent Application No. PCT/US2017/050269; Int'l Preliminary Report on Patentability; dated Mar. 21, 2019; 8 pages.

* cited by examiner

IMAGE ADJUSTMENTS BASED ON DEPTH OF FIELD ESTIMATIONS

CROSS REFERENCE TO RELATED APPLICATIONS

This application benefits from priority of Application No. 62/384,029, filed Sep. 6, 2016, and entitled "Use of Facial Landmarks in Depth of Field Applications," the disclosure of which is incorporated herein by its entirety

BACKGROUND

Many modern consumer electronics products have the capability to capture and process image data. For example, laptop computers, tablet computers, smartphones and personal media devices may have cameras to capture image data and image editing applications that process the image data. Image editing applications may provide tools to crop and/or rotate image content and also to alter image content, for example, by altering image brightness, color content, sharpness and the like.

Some image editing applications attempt to alter image characteristics autonomously thereby relieving human operators from the burden of selecting and applying image editing tools. One such automated operation involves filtering. An image editing application may attempt to identify which portions are to be filtered based on assessments of the portions' characteristics. Automated analysis tools, however, sometimes develop "false positives." For example, an analysis tool may assign a first portion of an image for relatively heavy filtering but a second portion of an image for little or no filtering. When these filtered and unfiltered portions actually belong to a common element of an image, such as a human face, these differences in filtering lead to undesirable artifacts.

DETAILED DESCRIPTION

Embodiments of the present disclosure provide techniques for automated analysis and filtering of image data. According to the embodiments, image data is analyzed to identify ROIs within the image content. The image data also may have depth estimates applied to content therein. One or more of the ROIs may be designated to possess a base depth, representing a depth of image content against which depths of other content may be compared. Moreover, the depth of the image content within a spatial area of an ROI may be set to be a consistent value, regardless of depth estimates that may have been assigned from other sources. Thereafter, other elements of image content may be assigned content adjustment values in gradients based on their relative depth in image content as compared to the base depth and, optionally, based on their spatial distance from the designated ROI.

The foregoing technique is expected to reduce the likelihood of false positives, which may occur if different elements of a common face, for example, one eye or both, or a nose, is assigned a different depth than other elements of the same face and are adjusted according to disparate parameters.

In an embodiment, parameter adjustments may be applied both for image content that has shallower depth than the base depth and for image content that has greater depth than the base depth.

In a further embodiment, multiple ROIs may be detected from image data and the depths of each of the ROIs may be designated as respective base depths. Content adjustment parameters may be assigned to other image content based on differences between their depths and the base depths.

Figure 1:
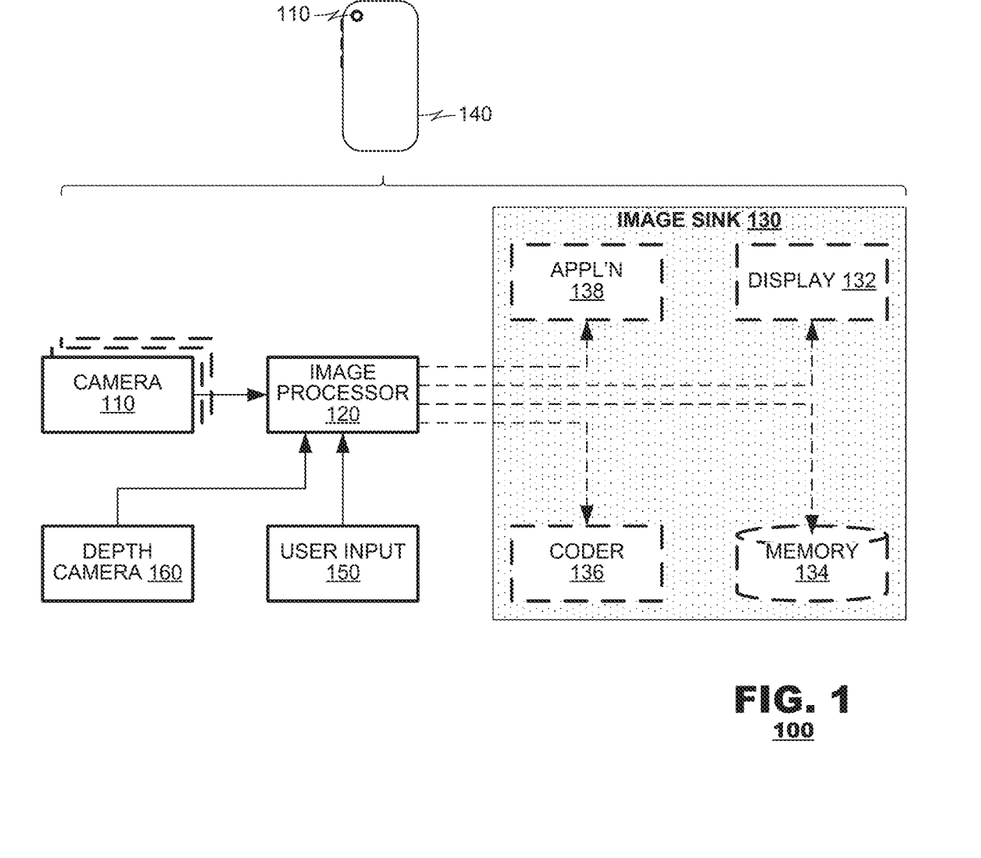
FIG. 1 is a block diagram of an imaging system according to an embodiment of the present disclosure.

FIG. 1 is a block diagram of an imaging system 100 according to an embodiment of the present disclosure. The system 100 may include one or more cameras 110 that capture image data representing a local environment; and an image processor 120 that performs processing on image data provided by the camera(s) 110.

The camera(s) 110 may output image data as a sequence of frames. The image processor 120 may receive user input identifying a moment of image capture and may select frame(s) to be used as a captured image responsive to the user input. The user input also may identify a mode of image capture to be used, for example, still image capture, time-lapse capture, stereoscope image capture, video capture, slow motion video capture and the like, some of which may require the image processor 120 to select a plurality of frames output from the camera(s) 110 as captured images.

The image processor 120 may output frames to other "image sink" components 130 within a device. For example, frames may be output to a display 132 or stored in memory 134. The frames may be output to a coder 136 for compression and, ultimately, transmission to another device (not shown). The frames also may be consumed by an application 138, such as an image editor or a gaming application, that executes on the device.

The image processor 120 may perform content adjustment operations on select images as discussed hereinbelow. For example, the frames associated with image capture may be filtered, they may have brightness adjusted, they may have their color saturation and/or hue adjusted, and/or they may be blended with content from other image(s). It is not required that an image processor 120 apply such filtering to all frames that it receives or to all frames that it outputs to image sinks 130. For example, it may be convenient to avoid performing filtering operations on frames that are output to a display 132 during image composition operations that are performed before image capture. When the image is composed and a user commands the device to perform image capture, the image processor 120 may perform its adjustment operations on the image(s) associated with the image capture event.

In an embodiment, the camera(s) 110 and image processor 120 may be provided within a processing device 140, such as a smartphone, a tablet computer, a laptop computer, a desktop computer, a portable media player, or the like. The processing device 140 may have other components, such as a user input device 150, which may be a touch screen controller, control buttons, and the like.

Figure 2:
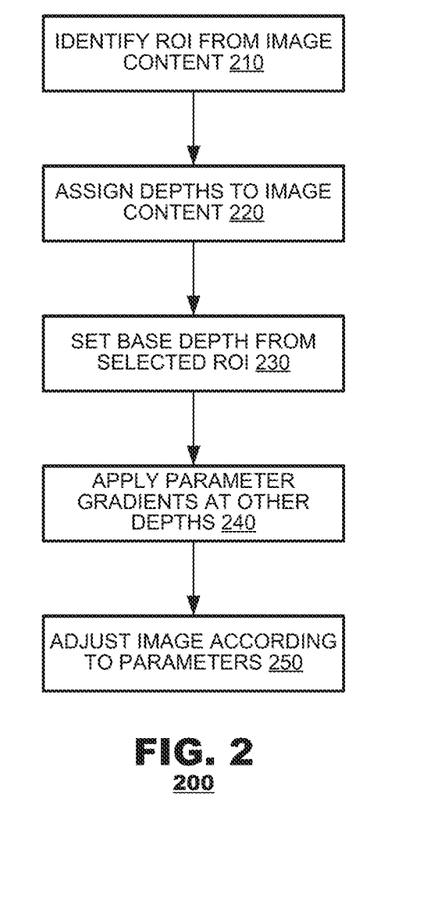
FIG. 2 illustrates a method according to an embodiment of the present disclosure.

FIG. 2 illustrates a method 200 according to an embodiment of the present disclosure. The method may identify a region of interest (ROI) from image content of a frame to be processed (box 210). The method 200 may assign depths to image content within the frame (box 220). The method 200 may set a base depth at a depth associated with the identified ROI (box 230). The method 200 may apply parameter gradients for other regions of the image content based on differences between their respective depths and the base depth assigned to the ROI (box 240). Finally, the method 200 may perform image adjustments according to the parameter adjustments (box 250).

ROI identification (box 210) may occur in a variety of ways. In a first embodiment, ROI identification may be performed based on face recognition processes or body recognition processes applied to the image content. ROI identification may be performed from an identification of images having predetermined coloration, for example, colors that are previously registered as corresponding to skin tones. Alternatively, ROI identification may be performed based on relative movement of image content across a temporally contiguous sequence of images. For example, content in a foreground of an image tends to exhibit larger overall motion in image content than background content of the same image, whether due to movement of the object itself during image capture or due to movement of a camera that performs the image capture.

Depth assignments (box 220) may occur in a variety of ways. In some embodiments, depth assignments may be made from analysis of image content itself. For example, depth estimation may be performed based on relative movement of image content across a temporally contiguous sequence of images. For example, content in a foreground of an image tends to exhibit larger overall motion in image content than background content of the same image, whether due to movement of the object itself during image capture or due to movement of a camera that performs the image capture. Depth estimation also may be performed from an assessment of an amount of blur in image content. For example, image content in focus may be identified as located at a depth corresponding to the focus range of the camera that performs image capture whereas image content that is out of focus may be identified as being located at other depths.

In another embodiment involving a stereoscopic camera, depth assignments may be made based on a disparity map generated from images output by the stereoscopic camera. For example, image content of a right-eye image may be compared to content of a left-eye image and disparities may be calculated for each pixel location in the respective images. The disparities may represent a map from which depth values are estimated.

In other embodiments, depth assignments may be made from data sources outside the image's content. When used with a camera having a movable lens system, depth assignments may be derived from lens positions that are applied during auto-focus operations, which tends to correspond to a depth of foreground images from the camera. Depth assignments may be derived from a depth camera 160 (FIG. 1), for example, a structure light or time-of-flight camera.

A base depth may be set (box 230) at a depth associated with a selected ROI. The base depth may represent a depth of image content that will be given a base level of image adjustment (possibly none). Thus, when blur filtering is applied, the ROI may be selected to have the sharpest content of any of the image content output by the method 200 following filtering, regardless of depth estimates that otherwise may have been applied to content within the ROI in box 220. Similarly, when brightness adjustments are applied, the ROI may be selected to have the brightest content of any of the image content output by the method 200 following filtering, and other image content may be made darker. Further, when color saturation adjustments are applied, the ROI may be selected to have the strongest color content of any of the image content output by the method 200 following filtering, and other image content may be made less saturated (e.g., more black and white). When color hue adjustments are applied, color content of the image may be altered based upon their depths (for example, blues may be converted to reds at various depths). Moreover, when blending adjustments are applied, blending weights may be assigned to content based upon their depths as compared to the base depth; the blending weights may determine relative strengths at which content from another image may be blended with the content of the image being adjusted. When multiple ROIs are present in image content, selection of the ROI to which the base depth is applied may be performed in a variety of ways, such as by user selection, by prioritization of ROIs based on object type (e.g., faces may have priority over other types of objects), depth estimates of the ROIs as determined in box 220, etc.

Parameter adjustments may be defined for other regions of the image content (box 240) in a graduated fashion, using the ROI's base level of adjustment as a reference. In an example where the ROI is given no blurring, blurring gradients may be defined that apply heavier levels of blur to regions of image content based on their distance from the ROI. Thus, image content that falls outside an ROI but is adjacent to the ROI may be given a lighter level of blur than image content that is at a farther distance from the ROI. Thus, the method 200 may develop a map that assigns various levels of blur to across the spatial area of the image.

Parameter adjustments also may be defined for the other regions based on those regions' relevant depths as compared to the base depth. For example, when an ROI is selected from foreground content, background content spatially adjacent to the ROI may be assigned adjustment parameters based on its relative depth. If an image contained foreground content at a shallow depth (the ROI), "mid-ground" content at an intermediate depth and background content at a large depth, the mid-ground content may be assigned a parameter adjustment based on its depth, even if the mid-ground content is spatially farther from the ROI than the background content.

And, of course, parameter adjustments may be assigned to the other regions based on a blend of the regions' spatial distance from an ROI and its depth as compared with the ROI's base depth.

Additionally, gradient levels may be assigned at edge regions of an ROI, where it borders other image elements.

Image adjustments may be applied to an image (box 250) based on the assigned adjustment parameters levels. For example, blurring may be performed by a blur filter, using settings that are assigned based on the parameters assigned in box 240. Similarly, brightness adjustments, color saturation/hue adjustments, blending adjustments, and the like, may be applied based on parameter levels that are assigned in box 240.

FIG. 3 illustrates operation of the method 200 of FIG. 2 on exemplary image data. In this example, FIG. 3(A) illustrates an exemplary input image on which the method 200 may operate. FIG. 3(B) illustrates operation of ROI identification, which in this example, occurs by performing face detection. FIG. 3(C) illustrates a depth map representing depth estimation applied to the input image data. FIG. 3(D) illustrates a map representing image adjustment parameters to be applied to image data. FIG. 3(E) is a graph illustrating exemplary weights that may be assigned to image data along the line e-e in FIG. 3(D).

Figure 3A:
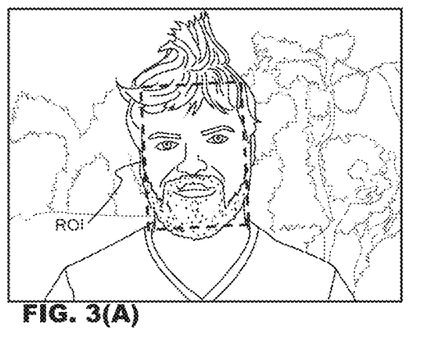
FIG. 3(A) illustrates an exemplary input image on which embodiments of the present disclosure may be performed.
Figure 3B:
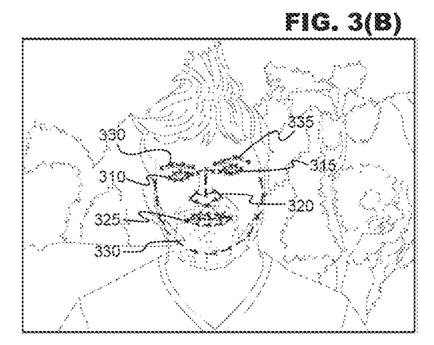
FIG. 3(B) illustrates operation of ROI identification according to an embodiment of the present disclosure.

As illustrated in FIG. 3(B), the face detection may detect predetermined facial "landmarks" from within image content that represent features of the human face. For example, the face detection may identify content representing eyes (represented by data points 310, 315), a nose 320, mouth 325, eyebrows 330, 335 and the profile of a head within image data. The face detection also may measure characteristics of these facial characteristics to determine their size in the image data. The method may identify an ROI from image content, shown in FIG. 3(A).

Figure 3C:
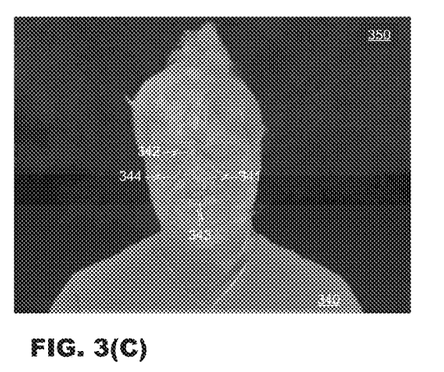
FIG. 3(C) illustrates a depth map according to an embodiment of the present disclosure.

As illustrated in FIG. 3(C), the depth estimation may distinguish foreground from background elements in the image data. The depth estimation, however, may assign different depths to different foreground elements in the depth map. For example, elements 311, 312, 313 and 314, which correspond respectively to structures about the eyes, nose, mouth and cheek of the subject, are shown having different depths. If filtering parameters were applied solely on the basis of depth assignments, then these elements 311-314 may be assigned different filtering strengths than other portions of the face data, which could introduce filtering artifacts in the resultant image data.

Figures 3D, 3E:
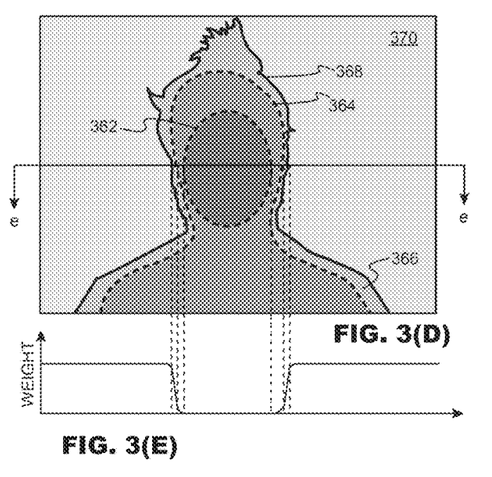
FIG. 3(D) illustrates a map of parameter strengths according to an embodiment of the present disclosure.
FIG. 3(E) is a graph illustrating exemplary parameter strengths according to an embodiment of the present disclosure.

As discussed, FIG. 3(D) illustrates image adjustment parameters that may be applied to image data. In FIG. 3(C), a dark color represents a smallest level of adjustment to be applied to data and the lighter colors represent heavier amounts of adjustment to be applied to image data. In an embodiment, the image content associated with an ROI may be given a lightest adjustment setting (no adjustment, in an embodiment), regardless of the depth assignments made to content therein. Thereafter, parameter gradients may be assigned that provide increasing levels of adjustment to image content as the depth differs from the depth of the ROI content. A graph of exemplary weights is shown in FIG. 3(E).

Figure 4:
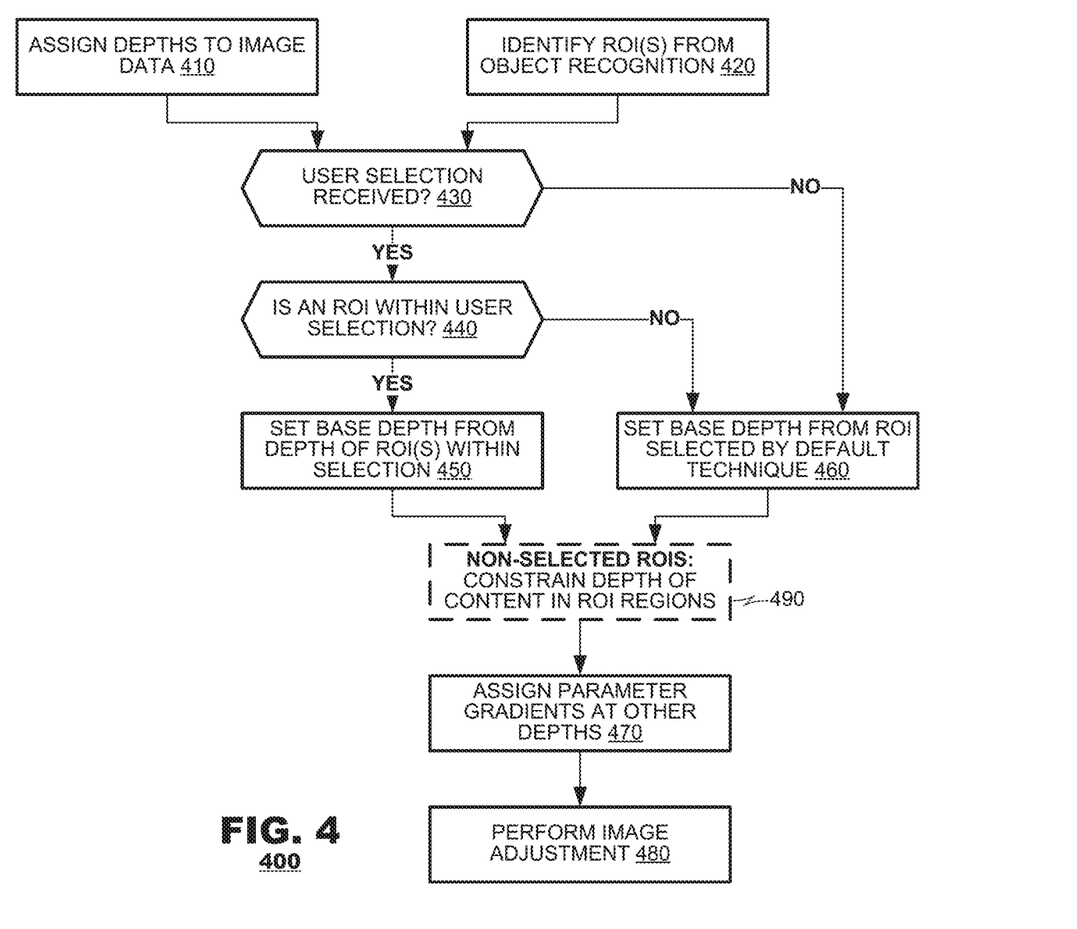
FIG. 4 illustrates a method according to another embodiment of the present disclosure.

FIG. 4 illustrates a method 400 according to another embodiment of the present disclosure. According to the embodiment, the method 400 may assign depths to input content (box 410). The method 400 may identify ROI(s) from the input image (box 420). The method 400 may determine whether a user selection was received (box 430). If a user selection was received, the method 400 may determine whether an ROI is found within a region of the image data associated with the user input (box 440). If an ROI is found within a region of the image data associated with the user input, the method 400 may assign a base depth to the selected ROI according to a depth of image content within the ROI in the region of the user comment (box 450). All content within the selected ROI may be assigned a common depth value as the base depth.

If no user selection was received (box 430) or if no ROI is found within the region of the user selection (box 440), the method 400 may set a base depth according to an ROI that is selected by a default technique, such as by content depth, object type classification and the like (box 460). Thereafter, the method 400 may apply parameter adjustments to image content at depths other than the base depth (box 470) and it may perform image adjustments according to the parameter assignment in box 470 (box 480).

In an embodiment, non-selected ROIs may have constrained depths assigned to them (box 490). That is, image content of an unselected ROI may have a common depth assigned to them regardless of depths that may have been assigned to the ROI content at box 410. In this manner, when parameter adjustments are assigned at box 470, the image content of the non-selected ROIs may have a uniform level of adjustment applied across the ROI content. And, because the ROIs are non-selected, during operation of box 470, they may have a level of image adjustment assigned to them based on a difference between the non-selected ROI's depth and the base depth of the ROI.

Depth assignments (box 410), ROI identification (box 420), base depth assignments (box 450, 460), parameter gradient assignments (box 470) and image adjustments (box 480), may be performed according to any of the techniques described hereinabove in connection with FIG. 2.

Figure 5A:
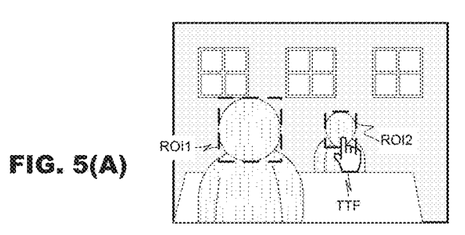
FIGS. 5(A), 5(B) and 5(C) each illustrates an exemplary input image on which embodiments of the present disclosure may be performed.
Figure 5B:
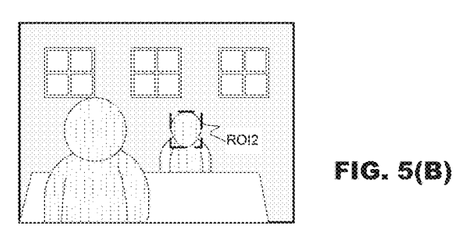

FIG. 5 illustrates processing of exemplary image data according to the method of FIG. 4. FIG. 5(A) illustrates an exemplary input image from which two ROIs are identified, ROI1 and ROI2. FIG. 5(A) illustrates user input (a touch to focus command, or "TTF") being entered on the screen in an area proximate to ROI2. Thus, the method may identify ROI2 as having the data to be assigned to the base depth (FIG. 5(B)).

Figure 5C:
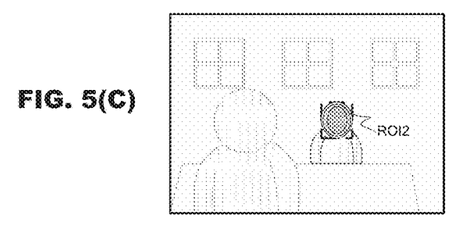

Parameter adjustments may be assigned to a remainder of the image data as their respective depths differ from the base depth of ROI2 (FIG. 5(C)). In this manner, the image content of ROI1 and other image content may be subject to image adjustment of various degrees.

Note that the image content of ROI1 likely possesses a shallower depth than the image content of ROI2. In the absence of a touch to focus command, the base depth may have been set at the depth of image content of ROI1 if the default selection process prioritized content depth over other factors. In this circumstance, other image content, including that of ROI2, would have been adjusted as their depths differ from that of ROI1. Thus, the embodiment of FIG. 4 provides user control over assignments of base depth within image content.

Operation of box 490 (FIG. 4) may cause a non-selected ROI—here, ROI1—to be assigned a common depth across the spatial area occupied by the ROI. In this manner, if depth assignments in box 410 (FIG. 4) caused different portions of ROI1 to be assigned markedly different depths, for example, some portions having a relatively shallow depth, other portions having a depth proximate to the depth of ROI2 and still other portions having a depth beyond ROI2, different levels of image adjustment may have been assigned across ROI1. When a common depth is assigned to the image data of ROI1, it may cause a uniform level of filtering to be applied to ROI1 based on a difference in depth between ROI1 and the selected ROI (ROI2).

Figure 6:
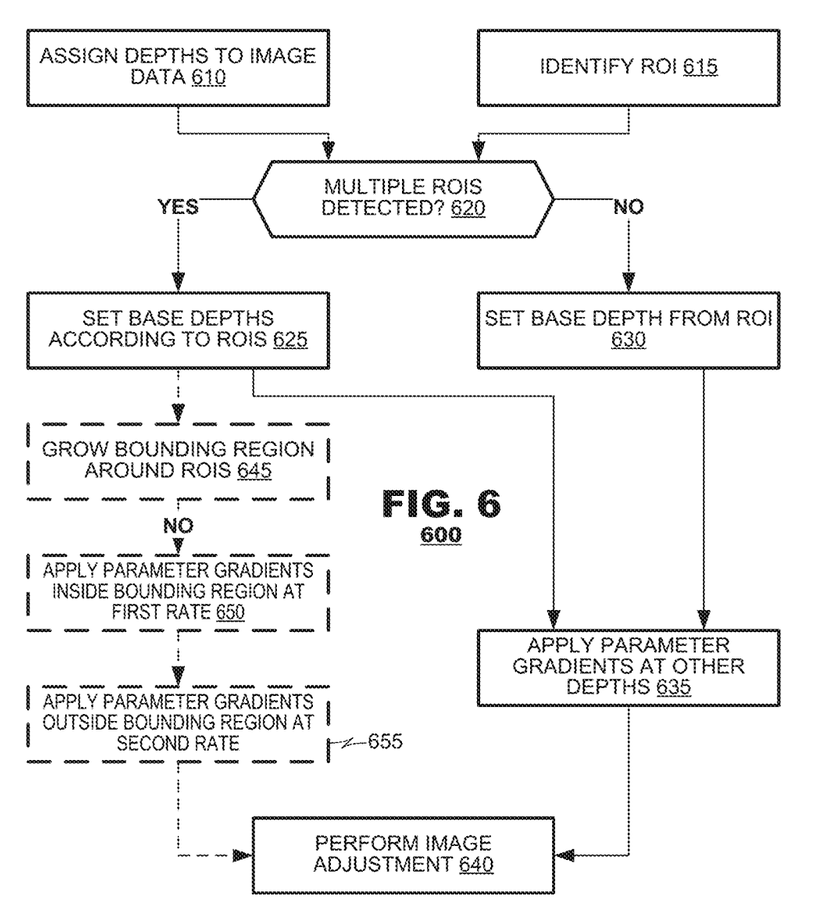
FIG. 6 illustrates a method 600 according to another embodiment of the present disclosure.

FIG. 6 illustrates a method 600 according to another embodiment of the present disclosure. According to the embodiment, the method 600 may assign depths to image data (box 610). The method 600 may identify ROI(s) from the input image (box 615), and may determine whether multiple ROIs were detected (box 620). If multiple ROIs were detected, the method 600 may set a plurality of base depths, each at the depths respectively assigned to the ROIs (box 625). If multiple ROIs are not detected, the method 600 may set a base depth according to a depth of the ROI (box 630). The method 600 may apply parameter adjustments to other image content based on differences in depth between the other content and the base depth(s) assigned either in box 625 or in box 630. Thereafter, the method 600 may perform image adjustment according to the parameters assigned in box 635 (box 640).

In another embodiment, when multiple base depths are assigned (box 625), the method 600 may grow a bounding region around the ROIs (box 645). Thereafter, the method 600 may apply parameter adjustments inside the bounding region at a first rate (box 655), and it may apply parameter adjustments outside the bounding region at a second rate (box 655). The method 600 may advance to box 640 and perform image adjustment according to the parameter levels assigned.

Depth assignments (box 610), ROI identification (box 615), base depth assignments (box 625, 630), and image adjustments (box 640), may be performed according to any of the techniques described hereinabove in connection with FIG. 2.

FIG. 7 illustrates processing of exemplary image data according to the method of FIG. 6. FIG. 7(A) illustrates an exemplary input image from which two ROIs are identified, ROI1 and ROI2. FIG. 7(B) is a graph illustrating idealized depth estimation of content along line b-b in FIG. 7(A). In practice, depth estimation data likely will include significant noise artifacts from the false positives discussed above; such artifacts are not illustrated in FIG. 7(B).

Figure 7A:
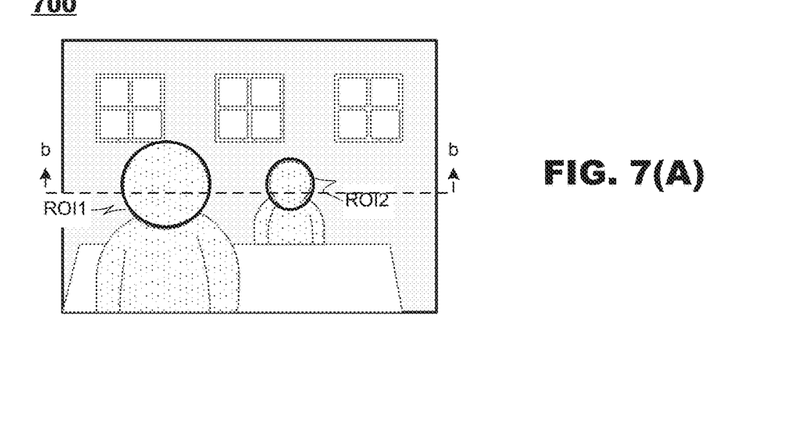
FIG. 7(A) illustrates an exemplary input image on which embodiments of the present disclosure may be performed.
Figure 7B:
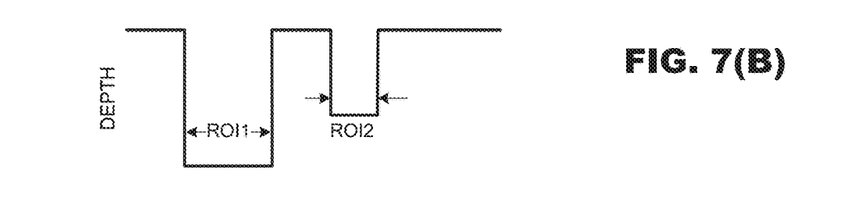
FIG. 7(B) is a graph illustrating idealized depth estimation of content along line b-b in FIG. 7(A).
Figure 7C:
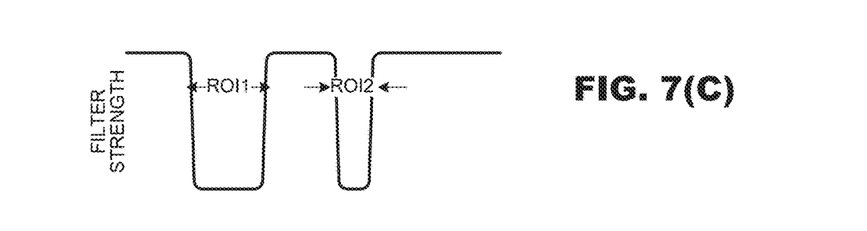
FIG. 7(C) is a graph illustrating exemplary filter strengths that may be applied according to an embodiment of the present disclosure.

FIG. 7(C) illustrates an exemplary set of blur filter settings that may be assigned to image content along the b-b line in FIG. 7(A). As illustrated, operation of boxes 625 and 630 (FIG. the data of the ROI1 and ROI2 may be assigned the smallest level of adjustment of all data in the image and data of other image regions may be assigned adjustment parameter settings according to a difference between their depth and the depth of the ROIs. The data of the ROIs may be assigned a common level of adjustment notwithstanding differences in their depth as illustrated in FIG. 7(B).

Figure 7D:
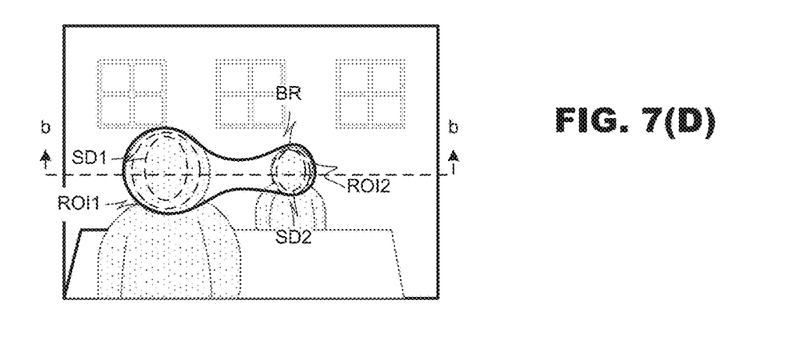
FIG. 7(D) illustrates exemplary regions of interest generated according to an embodiment of the present disclosure.
Figure 7E:
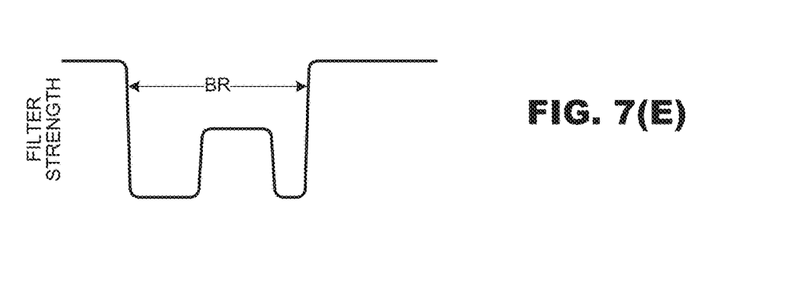
FIG. 7(E) is a graph illustrating exemplary filter strengths that may be applied according to an embodiment of the present disclosure.

FIG. 7(D) illustrates an exemplary bounding region BR generated that connects the ROIs. During operation of boxes 645-655 image data within the bounding region BR may be assigned a first level of parameter adjustments according to their depth whereas image data outside the bounding region may be assigned a second level of parameter adjustments. The gradients may be applied as image data depth deviates from the base depths SD1, SD2 assigned to the ROIs. In this manner, regions of image data in a spatial area between ROI1 and ROI2 may be given relatively lower levels of adjustment than background image data that is farther removed from either of the ROIs, even if the background image data has similar depth values to the image data within the bounding region.

In another embodiment (not shown), depths of multiple ROIs may be set to a single, common base depth, regardless of the depths that are assigned to image content of the ROI from image analysis. Consider the ROIs of FIG. 7(A), for example, which have depth estimates assigned as shown in FIG. 7(B) from image analysis. ROI1 and ROI2 may be assigned a single, common depth, which is set to the base depth of the image. For example, although image analysis of ROI2 may cause its image data to be assigned a depth that is larger than the depth of ROI1, the depth of ROI2 may be reset to be equal to the depth of ROI1 and this common depth value may be assigned as the base depth. Thereafter, parameter adjustments may be assigned to other image data based on differences in depth between the image data and the single, base depth of the image. In this manner, gradients may be assigned with reference to a single base depth, rather than multiple base depths as discussed in some of the foregoing embodiments.

The foregoing discussion has described image adjustments as techniques that are to be applied at increasing levels to image content at depths different than those of the base depth. For example, the discussion has assumed that no filtering, no brightness alteration, no color alteration and/or no blending would occur for image content at a base depth but such adjustments would be applied at increasing levels at locations and/or depths that differ from the base depth. Such discussion is merely exemplary. Other embodiments permit image adjustments to be applied at their strongest level for image content at the base depth, then to reduce levels at other depths and/or other locations. For example, brightness enhancement might be applied at a base depth at a strongest level, then enhancement levels might be lowered at other depths and/or other locations. Alternatively, a strongest level of blending may be applied to content of an ROI to achieve a "masking" effect; ROI data might be replaced with alternative content from an external source to mask ROI content from the image, and blendings to other content may be applied at reduced level(s) based on their estimated depths.

The principles of the present disclosure are not limited to the specific examples discussed above. In addition to blurring, brightness alteration, color adjustments and/or blending, image adjustment techniques can include spatial upsampling or downsampling, and the like. And, of course, the principles of the present disclosure permit application of multiple filters on a single image, each with their own selections of parameter gradient assigned based on content depth and/or location with respect to and ROI and its base depth.

In an embodiment, parameter gradients may be assigned based on one or more characteristics of an ROI. For example, where ROI detection is performed based on face detection, different gradients may be assigned if the face is detected as fully present in image content (e.g., the face faces the camera) or if the face is detected as partially-present in image content (e.g., the face is in full or partial profile). In another instance, parameter gradients may be applied based on selected characteristics of the detected ROI (e.g., eye-nose separation distance, face size, and the like).

Figure 8A:
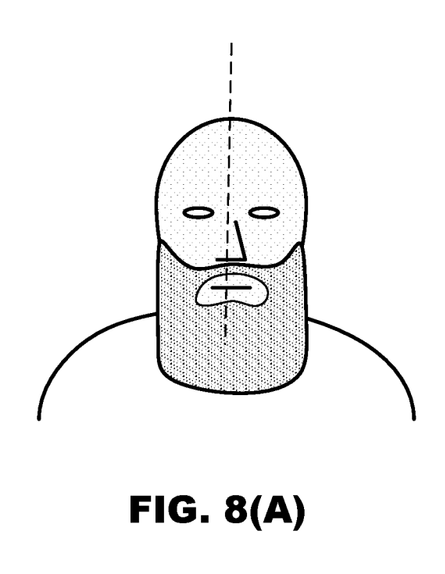
FIGS. 8(A) and 8(B) each illustrate exemplary regions of interest that may be processed by embodiments of the present disclosure.
Figure 8B:
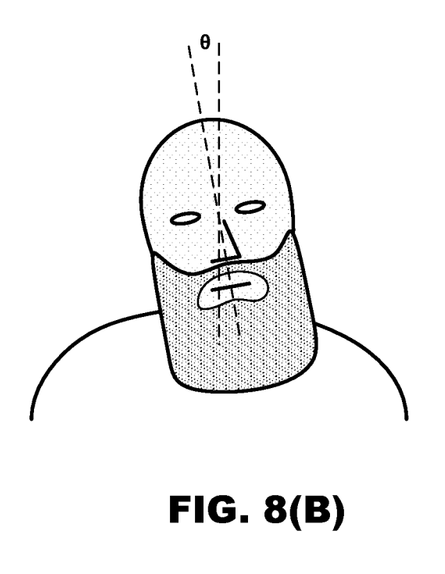

In some instances, gradients may be applied differently based on an orientation of an ROI. For example, as illustrated in FIGS. 8(A) and 8(B), when ROI identification is based on face detection, the ROI identification process also may detect an orientation of the ROI in image content. In the example of FIG. 8(A), a detected face is identified as having a long axis that is aligned to a vertical direction of image content. In FIG. 8(B), however, the detected face has a long axis that is rotated with respect to a vertical direction by an angle θ. Gradients may be applied in a directionally-specific manner along the ROI based on its orientation to alter amounts of image adjustment that will be applied.

In the examples illustrated in FIG. 8(A) and FIG. 8(B), gradients may be applied differently along the long axis of the ROI. For example, gradients may be applied to reduce an amount of image adjustment along a portion of the axis corresponding to a lower part of the face. In this example, such management of gradients may provide better adjustment results when an ROI represents a face that has a beard, for example.

Figure 9:
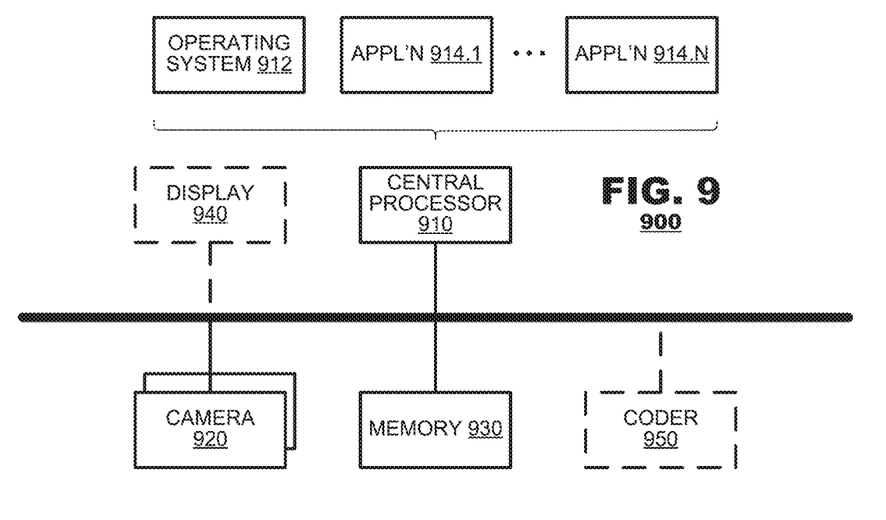
FIG. 9 illustrates an exemplary computer system suitable for use with embodiments of the present disclosure.

In an embodiment, the techniques described herein may be performed by a central processor of a computer system. FIG. 9 illustrates an exemplary computer system 900 that may perform such techniques. The computer system 900 may include a central processor 910, one or more cameras 920, and a memory 930 provided in communication with one another. The camera 920 may perform image capture and may store captured image data in the memory 930. Optionally, the device also may include sink components, such as a display 940 and a coder 950, as desired.

The central processor 910 may read and execute various program instructions stored in the memory 930 that define an operating system 912 of the system 900 and various applications 914.1-914.N. The program instructions may perform image filtering according to the techniques described herein. As it executes those program instructions, the central processor 910 may read, from the memory 930, image data created by the camera 920, and it may perform ROI detection, depth estimation, and filtering as described hereinabove.

As indicated, the memory 930 may store program instructions that, when executed, cause the processor to perform the techniques described hereinabove. The memory 930 may store the program instructions on electrical-, magnetic- and/or optically-based storage media.

The image processor 120 (FIG. 1) and the central processor 910 (FIG. 9) may be provided in a variety of implementations. They can be embodied in integrated circuits, such as application specific integrated circuits, field programmable gate arrays, digital signal processors and/or general purpose processors.

Several embodiments of the disclosure are specifically illustrated and/or described herein. However, it will be appreciated that the teachings of this the disclosure may find application in other implementations without departing from the spirit and intended scope of the disclosure.

We claim:

1. A method, comprising:
performing depth estimation on an image, the depth estimation generating an initial depth map having depth values for content elements of the image;
identifying a region of interest within the image;
altering, within the depth map, depth values of a plurality of content elements within the region of interest from initially-different depth values to a common value of a base depth;
assigning adjustment parameter strengths to the content elements of the image based on a comparison of depths of the content elements of the image and the base depth; and
adjusting the image according to the assigned parameter strengths.

2. The method of claim 1, wherein adjustment parameter strengths are assigned further based on a comparison of an image location of each content element and an image location of the region of interest.

3. The method of claim 1, wherein the adjusting is blur filtering, and content at the base depth has a lowest-strength filtering for the image.

4. A method, comprising:
performing depth estimation on an image;
identifying a region of interest within the image;
assigning a base depth to content of the image within the region of interest;
assigning adjustment parameter strengths to content of the image based on a comparison of depths of the image content and the base depth of the region of interest, wherein an edge portion of the region of interest is assigned a parameter strength that is representing a gradient level; and
adjusting the image according to the assigned parameter strengths.

5. A method, comprising:
performing depth estimation on an image;
identifying a region of interest within the image;
assigning a base depth to content of the image within the region of interest;
assigning adjustment parameter strengths to content of the image based on a comparison of depths of the image content and the base depth of the region of interest, wherein different portions of the region of interest are assigned different parameter strengths based on orientation of the different portions of the region of interest; and
adjusting the image according to the assigned parameter strengths.

6. The method of claim 1, wherein the adjusting is brightness adjustment.

7. The method of claim 1, wherein the adjusting is color saturation adjustment.

8. The method of claim 1, wherein the adjusting is color hue adjustment.

9. The method of claim 1, wherein the adjusting is a blending of another image with the image.

10. The method of claim 1, wherein the depth estimation is derived from analysis of image content.

11. The method of claim 1, wherein,
the identifying comprises identifying multiple regions of interest, and
the altering comprises altering depth values of content elements that correspond to the multiple regions of interest to a common base depth.

12. The method of claim 1, wherein,
the identifying comprises identifying multiple regions of interest, and,
the altering comprises altering depth values of content elements that correspond to each of the multiple regions of interest to a respective base depth, and
the assigning comprises assigning adjustment parameter strengths to the content elements of the image based on a comparison of depths of the content elements of the image and the respective base depths.

13. The method of claim 1, wherein, the identifying comprises identifying multiple regions of interest, and a base depth is assigned to one of the multiple regions of interest according to a selection protocol.

14. The method of claim 13, wherein the selection protocol selects the one region of interest in response to user input.

15. The method of claim 13, wherein the selection protocol selects the one region of interest based on priority among types of regions of interest.

16. The method of claim 13, wherein the selection protocol selects the one region of interest based on a priority among content depth within the regions of interest determined by the depth estimation.

17. The method of claim 1, wherein the region of interest is identified by face detection.

18. The method of claim 17, wherein the parameter strengths are assigned as gradients along an axis of a detected face.

19. A device, comprising:
a camera, and
an image processor to:
perform depth estimation on an image output by the camera, the depth estimation generating an initial depth map having depth values for content elements of the image;
identify a region of interest within the image;
alter, within the depth map, depth values of a plurality of content elements within the region of interest from initially-different depth values to a common value of a base depth;
assign parameter strengths to the content elements of the image based on a comparison of depths of the content elements of the image and the base depth; and
adjust the image according to the assigned parameter strengths.

20. The device of claim 19, wherein the image processor:
identifies multiple regions of interest, and
assigns adjustment parameter strengths based on a comparison of an image location of each content element and an image location of a region of interest of the multiple regions of interest.

21. The method of claim 1, wherein the adjusting is blur filtering.

22. A device, comprising:
a camera, and
an image processor to:
perform depth estimation on an image output by the camera,
identify a region of interest within the image;
assign a base depth to content of the image within the region of interest,
assign parameter strengths to content of the image based on a comparison of depths of the image content and the base depth, wherein
an edge portion of the region of interest is assigned a parameter strength that is representing a gradient level; and
adjust the image according to the assigned parameter strengths.

23. A device, comprising:
a camera, and
an image processor to:
perform depth estimation on an image output by the camera,
identify a region of interest within the image;
assign a base depth to content of the image within the region of interest,
assign parameter strengths to content of the image based on a comparison of depths of the image content and the base depth, wherein different portions of the region of interest are assigned different parameter strengths based on orientation of the different portions of the region of interest; and
adjust the image according to the assigned parameter strengths.

24. The device of claim 19, wherein, the image processor:
identifies multiple regions of interest, and
alters, within the depth map, depth values of content elements that correspond to the multiple regions of interest to a common base depth.

25. The device of claim 19, wherein, the image processor:
identifies multiple regions of interest,
alters depth values of content elements that correspond to each of the regions of interest to a respective base depth, and
assigns adjustment parameter strengths to the content elements of the image based on a comparison of depths of the content elements of the image and the base depths.

26. The device of claim 19, wherein, the image processor:
identifies multiple regions of interest, and
assigns a base depth to one of the regions of interest according to a selection protocol.

27. The device of claim 26, further comprising a user input device, wherein the selection protocol selects the one region of interest in response to user input.

28. The device of claim 26, wherein the selection protocol selects the one region of interest based on priority among types of regions of interest.

29. The device of claim 26, wherein the selection protocol selects the one region of interest based on a priority among content depth within the regions of interest determined by the depth estimation.

30. A non-transitory computer readable storage medium storing program instructions that, when executed by a processing device, causes the device to:
perform depth estimation on an image, the depth estimation generating an initial depth map having depth values for content elements of the image;
identify a region of interest within the image;
alter, within the depth map, depth values of a plurality of content elements within the region of interest from initially-different depth values to a common value of a base depth;
assign adjustment parameter strengths to the content elements of the image based on a comparison of depths of the content elements of the image and the base depth; and
filter the image according to the assigned adjustment parameter strengths.

31. A non-transitory computer readable storage medium storing program instructions that, when executed by a processing device, causes the device to:
perform depth estimation on an image;
identify a region of interest within the image;
assign a base depth to content of the image within the region of interest;
assign adjustment parameter strengths to content of the image based on a comparison of depths of the image content and the base depth, wherein an edge portion of the region of interest is assigned a parameter strength that is representing a gradient level; and
filter the image according to the assigned adjustment parameter strengths.

32. The storage medium of claim 30, wherein,
the identifying comprises identifying multiple regions of interest, and
the program instructions cause the processing device to alter depth values of content elements that correspond to the multiple regions of interest to a common base depth.

33. The storage medium of claim 30, wherein,
the identifying comprises identifying multiple regions of interest, and the program instructions cause the processing device to:
alter depth values of content elements that correspond to each of the regions of interest to a respective base depth, and
assign adjustment parameter strengths to the content elements of the image based on a comparison of depths of the content elements of the image and the base depths.

34. The storage medium of claim 30, wherein,
the identifying comprises identifying multiple regions of interest, and
the program instructions cause the processing device to assign a base depth to one of the regions of interest according to a selection protocol.

35. A non-transitory computer readable storage medium storing program instructions that, when executed by a processing device, causes the device to:
perform depth estimation on an image;
identify a region of interest within the image;
assign a base depth to content of the image within the region of interest;
assign adjustment parameter strengths to content of the image based on a comparison of depths of the image content and the base depth, wherein different portions of the region of interest are assigned different parameter strengths based on orientation of the different portions of the region of interest; and
filter the image according to the assigned adjustment parameter strengths.

36. The method of claim 11, wherein the assigning adjustment parameter strengths comprises:
applying adjustment parameter strengths inside a bounding region at a first rate and applying adjustment parameter strengths outside the bounding region at a second rate, wherein the bounding region is an image region that contains at least two regions of interest of the multiple regions of interest.

37. The method of claim 12, wherein the assigning adjustment parameter strengths comprises:
applying adjustment parameter strengths inside a bounding region at a first rate and applying adjustment parameter strengths outside the bounding region at a second rate, wherein the bounding region is an image region that contains at least two regions of interest of the multiple regions of interest.

38. The method of claim 1, wherein the region of interest comprises content elements of the image that belong to an object.

* * * * *